United States Patent
Chiang et al.

(10) Patent No.: US 11,536,238 B2
(45) Date of Patent: Dec. 27, 2022

(54) GENERATOR CONTROL APPARATUS SUITABLE FOR INTEGRATED STARTER GENERATOR AND METHOD OF STARTING THE SAME

(71) Applicant: DELTA ELECTRONICS, INC., Taoyuan (TW)

(72) Inventors: Hung-Hsing Chiang, Taoyuan (TW); Chin-Hao Chen, Taoyuan (TW); Cheng-Chung Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/371,636

(22) Filed: Jul. 9, 2021

(65) Prior Publication Data
US 2022/0195972 A1    Jun. 23, 2022

(30) Foreign Application Priority Data
Dec. 21, 2020   (CN) .......................... 202011517683.X

(51) Int. Cl.
*F02N 19/00* (2010.01)
*F02N 11/04* (2006.01)
*F02N 11/08* (2006.01)

(52) U.S. Cl.
CPC ............ *F02N 19/005* (2013.01); *F02N 11/04* (2013.01); *F02N 11/087* (2013.01); *F02N 11/0859* (2013.01); *F02N 2011/0896* (2013.01); *F02N 2019/007* (2013.01); *F02N 2019/008* (2013.01); *F02N 2200/041* (2013.01); *F02N 2200/043* (2013.01); *F02N 2200/044* (2013.01); *F02N 2300/102* (2013.01); *F02N 2300/108* (2013.01)

(58) Field of Classification Search
None
See application file for complete search history.

(56) References Cited

U.S. PATENT DOCUMENTS

| 5,458,098 A | * | 10/1995 | Yagi | ...................... F02N 19/005 |
| | | | | 123/179.3 |
| 5,713,320 A | * | 2/1998 | Pfaff | ...................... F02N 19/005 |
| | | | | 123/179.3 |

(Continued)

FOREIGN PATENT DOCUMENTS

| CN | 1459560 A | * | 12/2003 | ........... F02N 19/005 |
| CN | 1236206 C | * | 1/2006 | ........... F02N 19/005 |

(Continued)

*Primary Examiner* — Kevin R Steckbauer
(74) *Attorney, Agent, or Firm* — Muncy, Geissler, Olds & Lowe, P.C.

(57) ABSTRACT

A method of starting an integrated starter generator drives a starter generator without using a rotor position sensor to start an engine. The method includes the following steps of: (a) applying a first drive current with a first frequency and a first amplitude to drive the starter generator to reversely rotate in a speed open-loop control mode, and acquiring a first load information according to a drive voltage and the first drive current of the starter generator, (b) confirming whether the first load information meets a heavy load condition, (c) stopping reversely rotating the starter generator when the first load information meets the heavy load condition, and (d) forwardly rotating the starter generator to drive the engine to start.

8 Claims, 10 Drawing Sheets

(56) References Cited

U.S. PATENT DOCUMENTS

| | | | | |
|---|---|---|---|---|
| 6,453,863 | B1* | 9/2002 | Pels | F02N 11/04 123/179.3 |
| 6,782,860 | B2* | 8/2004 | Makajima | F02N 19/005 123/179.5 |
| 6,840,203 | B2* | 1/2005 | Wakitani | F02N 11/0859 290/37 R |
| 7,105,944 | B2* | 9/2006 | Wakitani | F02N 11/0848 307/10.6 |
| 7,191,746 | B2* | 3/2007 | Nakamura | F02N 19/005 123/179.3 |
| 7,269,499 | B2* | 9/2007 | Murakami | F02N 11/0814 701/112 |
| 7,461,621 | B2* | 12/2008 | Ota | F02B 23/104 123/179.3 |
| 7,891,330 | B2* | 2/2011 | Kishibata | F02N 19/005 123/179.14 |
| 8,036,817 | B2* | 10/2011 | Ota | F02N 99/006 701/113 |
| 8,448,621 | B2* | 5/2013 | Osawa | F02N 19/005 701/112 |
| 8,498,801 | B2* | 7/2013 | Nagatsuyu | F02D 41/061 701/112 |
| 8,573,173 | B2* | 11/2013 | Garrard | H02P 6/22 123/179.3 |
| 8,770,163 | B2* | 7/2014 | Quincerot | F02N 11/10 74/6 |
| 9,346,458 | B2* | 5/2016 | Ohkuma | B60W 20/00 |
| 10,100,799 | B2* | 10/2018 | Bernardini | F02N 19/005 |
| 10,351,122 | B2* | 7/2019 | Fujimoto | B60W 20/00 |
| 10,605,221 | B2* | 3/2020 | Loveall | F02N 19/005 |
| 10,711,756 | B1* | 7/2020 | Pettersson | B60W 10/08 |
| 10,724,489 | B2* | 7/2020 | Matsuyama | F02N 11/0862 |
| 11,136,930 | B2* | 10/2021 | Owatari | F02N 11/0855 |
| 2003/0140881 | A1* | 7/2003 | Makajima | F02N 5/00 123/179.5 |
| 2004/0000281 | A1* | 1/2004 | Wakitani | F02N 19/005 290/38 R |
| 2004/0000882 | A1* | 1/2004 | Wakitani | F02N 11/04 318/66 |
| 2005/0228575 | A1* | 10/2005 | Murakami | F02D 41/065 701/112 |
| 2006/0081207 | A1* | 4/2006 | Nakamura | F02N 19/005 123/179.3 |
| 2007/0062476 | A1* | 3/2007 | Ota | F02B 23/104 123/179.4 |
| 2007/0204827 | A1* | 9/2007 | Kishibata | F02N 19/005 123/179.5 |
| 2008/0105230 | A1* | 5/2008 | Kishibata | F02N 11/0803 123/179.5 |
| 2009/0088958 | A1* | 4/2009 | Ota | F02D 13/0234 701/113 |
| 2010/0250105 | A1* | 9/2010 | Nagatsuyu | F02D 41/061 701/112 |
| 2010/0257951 | A1* | 10/2010 | Quincerot | F02N 11/0814 74/6 |
| 2011/0017165 | A1* | 1/2011 | Osawa | F02N 11/0818 123/179.4 |
| 2011/0114049 | A1* | 5/2011 | Garrard | H02P 6/22 290/31 |
| 2012/0160202 | A1* | 6/2012 | Vogt | F02N 11/0814 903/902 |
| 2012/0204827 | A1* | 8/2012 | Sieber | F02N 19/005 123/179.4 |
| 2013/0328323 | A1* | 12/2013 | Reik | F02N 5/02 290/38 B |
| 2014/0074333 | A1* | 3/2014 | Ohkuma | B60W 10/08 903/930 |
| 2017/0282890 | A1* | 10/2017 | Fujimoto | B60W 10/08 |
| 2018/0223787 | A1* | 8/2018 | Bernardini | F02N 19/005 |
| 2019/0226440 | A1* | 7/2019 | Murakami | H02P 9/48 |
| 2019/0242351 | A1* | 8/2019 | Matsuyama | H02P 27/06 |
| 2020/0018278 | A1* | 1/2020 | Katsura | B60K 6/40 |
| 2020/0040861 | A1* | 2/2020 | Loveall | F02N 19/005 |
| 2020/0165993 | A1* | 5/2020 | Owatari | F02D 41/062 |
| 2020/0240382 | A1* | 7/2020 | Pettersson | F02N 11/06 |
| 2020/0392932 | A1* | 12/2020 | Soda | F02B 75/18 |
| 2021/0222639 | A1* | 7/2021 | Killingseder | F02N 11/0862 |
| 2021/0293214 | A1* | 9/2021 | Umashankar | F02N 11/04 |

FOREIGN PATENT DOCUMENTS

| | | | | |
|---|---|---|---|---|
| CN | 104018973 A | * | 9/2014 | F02N 11/0825 |
| CN | 104018973 B | * | 3/2016 | F02N 11/0825 |
| CN | 110056434 A | * | 7/2019 | F02N 19/005 |
| CN | 112805465 A | * | 5/2021 | F02B 61/02 |
| DE | 4430651 A1 | * | 3/1995 | F02N 11/08 |
| EP | 1046813 A1 | * | 10/2000 | F02N 19/005 |
| EP | 1365145 A2 | * | 11/2003 | F02N 19/005 |
| EP | 1365145 A3 | * | 8/2006 | F02N 19/005 |
| EP | 2772642 A1 | * | 9/2014 | F02N 11/0825 |
| EP | 2772642 B1 | * | 8/2016 | F02N 11/0825 |
| EP | 3825539 A1 | * | 5/2021 | F02B 61/02 |
| EP | 3851664 A1 | * | 7/2021 | F01L 1/047 |
| EP | 3825539 A4 | * | 9/2021 | F02B 61/02 |
| JP | H-01295630 A | | 11/1989 | |
| JP | 2000087777 A | | 3/2000 | |
| JP | 2003343404 A | * | 12/2003 | F02N 19/005 |
| JP | 3969641 B2 | * | 9/2007 | F02N 19/005 |
| JP | 2012092656 A | * | 5/2012 | F02N 11/04 |
| JP | 2014167287 A | * | 9/2014 | F02N 11/0825 |
| JP | 6180757 B2 | * | 8/2017 | F02N 11/0825 |
| JP | 2019124206 A | * | 7/2019 | F02N 19/005 |
| WO | WO-0227182 A1 | * | 4/2002 | F02D 41/009 |
| WO | WO-0235087 A1 | * | 5/2002 | F02N 19/005 |
| WO | WO-2012107016 A2 | * | 8/2012 | B60K 6/48 |
| WO | WO-2012107016 A3 | * | 1/2013 | B60K 6/48 |
| WO | WO-2019092753 A1 | * | 5/2019 | F02N 11/04 |
| WO | WO-2020059233 A1 | * | 3/2020 | F02B 61/02 |

\* cited by examiner

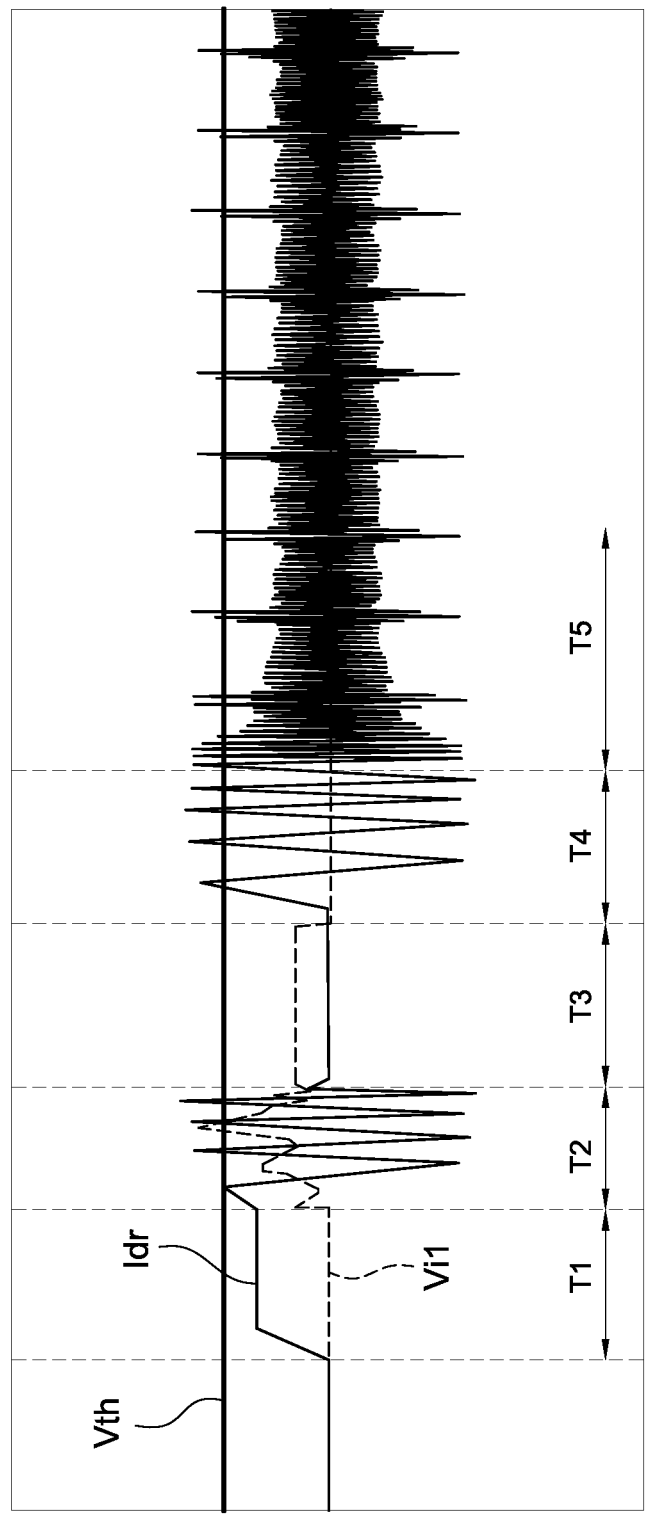

GENERATOR CONTROL APPARATUS SUITABLE FOR INTEGRATED STARTER GENERATOR AND METHOD OF STARTING THE SAME

BACKGROUND

Technical Field

The present disclosure relates to a generator control apparatus suitable for a starter generator and a method of starting the starter generator, and more particularly to a generator control apparatus suitable for a starter generator without using a sensor.

Description of Related Art

The statements in this section merely provide background information related to the present disclosure and do not necessarily constitute prior art.

The traditional portable generator system usually starts the engine by using a hand-pull valve. In recent years, portable generators started by pressing buttons have gradually become the mainstream of the market, and a DC brush motor is usually used as a power start system. However, due to the disadvantages of high noise, easy damage, and space occupation of the DC brush motor, portable generator system manufacturers tend to develop and use integrated starter generator (ISG) systems. That is, the generator is used as an electric motor to drive the engine when the generator is stared so as to replace the traditional starting system using the DC motor. However, how to effectively implement ISG and integrate the current generator system has become the direction of technical competition among various manufacturers.

As shown in FIG. 1, which shows a schematic view of a pressure change inside an engine cylinder. When an engine piston P is at a compression top dead center Cp, the pressure in the engine cylinder is very high, and therefore the torque required to drive the engine to rotate is very large. In usual, the rotor of the starter generator must forwardly rotate in a low-resistance areal RI to drive the engine, and use the moment of inertia of starter generator to assist in crossing the compression top dead center Cp to successfully start the engine. However, the conventional starting methods are nothing more than: (1). detecting the position of an engine crank or the position of a flywheel of the starter generator, (2). continuously reversing a fixed arc, (3). detecting whether the speed of the starter generator is reduced or not. In the above-mentioned methods of (1) and (3), the control system needs a position or speed sensor to sense the position and speed of the rotor of the starter generator, and therefore the two methods do not apply to the control system without sensors. In the above-mentioned method of (2), since the starting position of the rotor is different every time, if it continues to rotate in a fixed arc before stopping, it will cause time waste and excess power consumption.

Accordingly, the present disclosure provides a generator control apparatus suitable for an integrated starter generator and a method of starting the same to reduce the circuit cost and shorten the time of staring the engine through the generation control apparatus without using a sensor.

SUMMARY

An object of the present disclosure is to provide a method of starting an integrated starter generator to solve the problems of the existing technology.

The method drives a starter generator without using a rotor position sensor to start an engine, and the method includes steps of: (a) applying a first drive current with a first frequency and a first amplitude to drive the starter generator to reversely rotate in a speed open-loop control mode, and acquiring a first load information according to a drive voltage and the first drive current of the starter generator, (b) confirming whether the first load information meets a heavy load condition, (c) stopping reversely rotating the starter generator when the first load information meets the heavy load condition, and (d) forwardly rotating the starter generator to drive the engine to start.

Another object of the present disclosure is to provide a generator control apparatus suitable for starting an integrated starter generator to solve the problems of the existing technology.

The generator control apparatus suitable for starting an integrated starter generator is coupled to a starter generator without using a rotor position sensor, and the starter generator drives an engine to start. The generator control apparatus includes an inverter and a control module. The inverter receives a DC voltage, and is coupled to the starter generator. The control module is coupled to the inverter and the starter generator, and provides a PWM signal to the inverter so that the inverter converts the DC voltage into a drive voltage and a drive current to drive the starter generator. The control module adjusts the PWM signal according to whether the drive voltage and the drive current correspondingly meet a heavy load condition in a speed open-loop control mode so as to control the starter generator forwardly or reversely rotating to drive the engine to start.

The purpose and effect of the present disclosure are that since the generator control apparatus uses a speed open-loop control mode in a start mode of the starter generator, that is, provides the drive current with an amplitude and a frequency to control forward or reverse rotation of the starter generator without referring the speed of the starter generator, the loading of the starter generator can be accurately estimated without relying on the position sensor or speed information during the reverse-rotation process so as to facilitate the subsequent control of the starter generator in the start mode. Compared with the conventional method of using speed information to determine the loading of the starter generator, it has better load estimation accuracy when the initial position of the rotor of the starter generator is closer to the compression top dead center. Since the generator control apparatus uses a first load information and the corresponding heavy load condition to determine whether the rotor of the starter generator should stop reversely rotating, the time to start the engine and the power consumption can be significantly reduced compared with the related art that uses a position sensor to continuously rotate the rotor of the starter generator by a predetermined arc.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 5C is a second schematic waveform of starting the engine by the starter generator according to the present disclosure.

DETAILED DESCRIPTION

Figure 1:
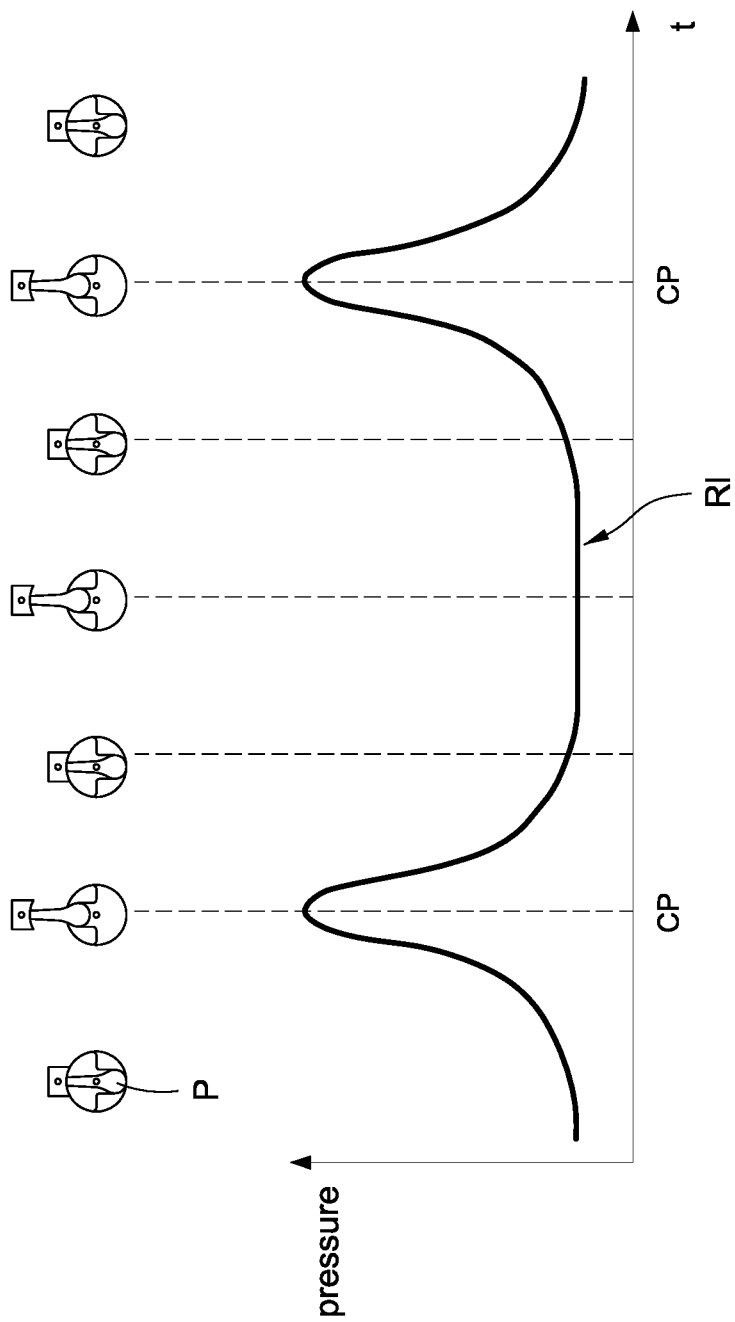
FIG. 1 is a schematic view of a pressure change inside an engine cylinder.

Reference will now be made to the drawing figures to describe the present disclosure in detail. It will be understood that the drawing figures and exemplified embodiments of present disclosure are not limited to the details thereof.

Figure 2:
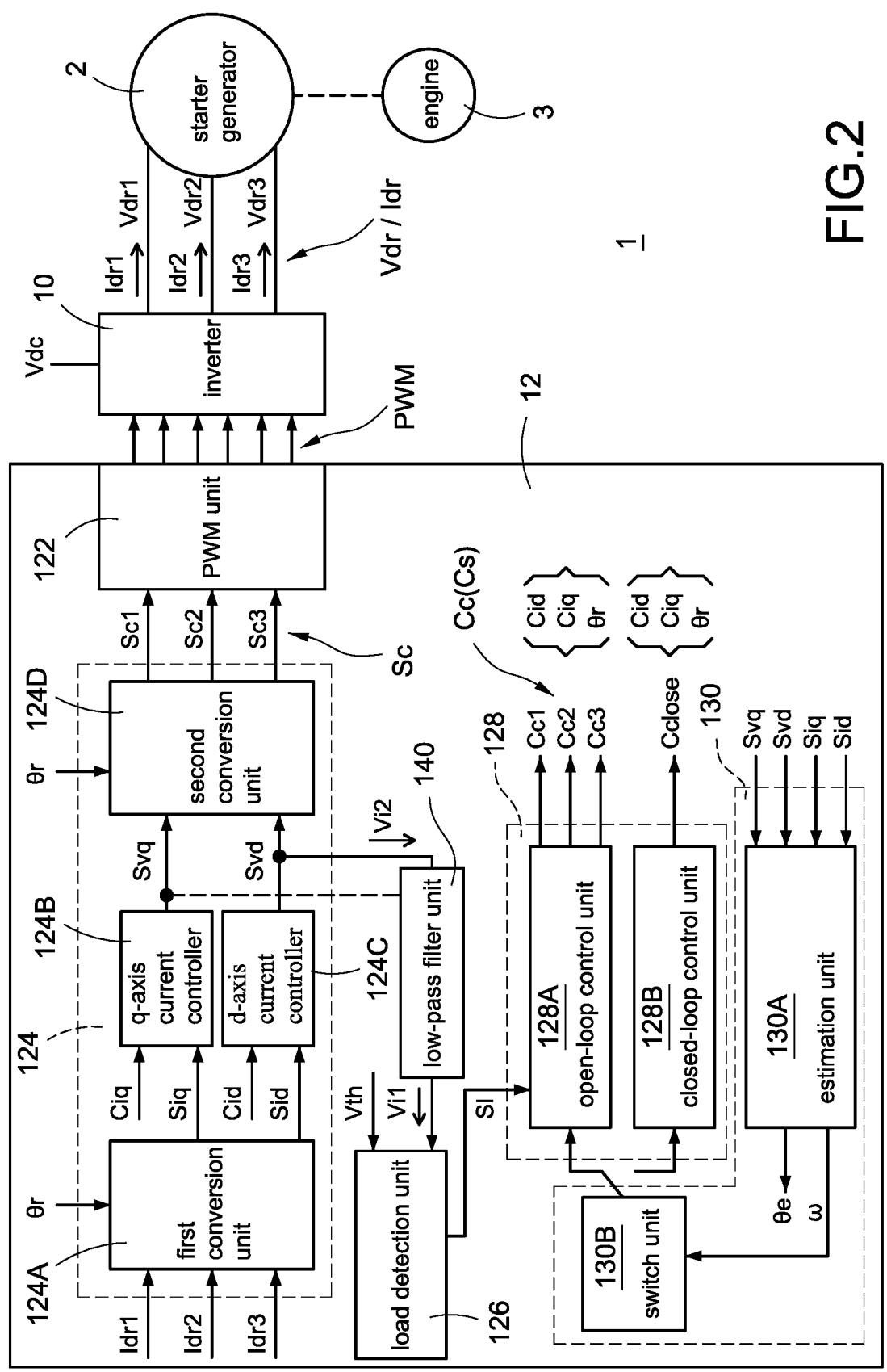
FIG. 2 is a block diagram of a generator control apparatus suitable for an integrated starter generator according to present disclosure.

Please refer to FIG. 2, which shows a block diagram of a generator control apparatus suitable for an integrated starter generator according to present disclosure. The generator control apparatus 1 is coupled to an integrated starter generator 2 (ISG, hereinafter referred to as "starter generator"), and the starter generator 2 drives an engine to start. In a start mode, the starter generator 2 operates as a motor to start the engine 3. After the engine 3 bursts to start, the starter generator 2 operates in a generation mode. In the generation mode, the engine 3 drives the starter generator 2 to operate as a generator to generate power electricity. In the start mode, a DC voltage Vdc supplies power to drive starter generator 2 so that the starter generator 2 operates to start the engine 3. In the generation mode, the engine 3 drives the starter generator 2 so that the starter generator 2 provides drive voltages Vdr1-Vdr3 corresponding to phases of the starter generator 2 to the generator control apparatus 1.

The generator control apparatus 1 includes an inverter 10 and a control module 12. One end of the inverter 10 receives the DC voltage Vdc and the other of the inverter 10 is coupled to the starter generator 2. The control module 12 is coupled to the inverter 10. In the start mode, the control module 12 provides a PWM signal PWM to control the inverter 10 to convert the DC voltage Vdc into AC drive voltages Vdr1-Vdr3 so that the drive voltages Vdr1-Vdr3 and drive current Idr1-Idr3 can drive the starter generator 2. The control module 12 includes a PWM unit 122, a drive unit 124, a load detection unit 126, and a loop control unit 128. The PWM unit 122 is coupled to the inverter 10, and modulates the PWM signal PWM according to control signals Sc1-Sc3. The drive unit 124 is coupled to the PWM unit 122 and the starter generator 2, and provides a first load information Vi1 according to the drive voltages Vdr1-Vdr3 and the drive currents Idr1-Idr3 (corresponding to phases of the starter generator 2) during the process of driving the starter generator 2 from being stationary to reversely rotation.

The load detection unit 126 is coupled to the drive unit 124, and determines whether the first load information Vi1 meets a heavy load condition to acquire a determination result, and provides a load signal Sl according to the determination result. In this embodiment, the heavy load condition may have the following four but not limited possible states, which will be further explained later. In the start mode and during the process of reversely rotating the starter generator 2, when the load detection unit 126 determines that the first load information Vi1 meets the heavy load condition, the load detection unit 126 provides the load signal Sl representing the stop of reverse rotation and the start of forward rotation of the starter generator 2. On the contrary, the load detection unit 126 provides the load signal Sl representing the reverse rotation of the starter generator 2. The loop control unit 128 is coupled to the load detection unit 126 and the drive unit 124, and provides a control command Cc that controls the forward or reverse rotation of the starter generator 2 to the drive unit 124 according to the load signal Sl in a speed open-loop control mode. The control command Cc includes current commands Cid, Ciq that control the speed of the starter generator 2 and an angle command Or that controls the angle of the starter generator 2. The drive unit 124 produces the control signals Sc1-Sc3 (corresponding to phases of the starter generator 2) according to the drive currents Idr1-Idr3 and the control command Cc so that the PWM unit 122 correspondingly modulates the PWM signal PWM for controlling the starter generator 2.

The drive unit 124 includes a first conversion unit 124A, a q-axis current controller 124B, a d-axis current controller 124C, and a second conversion unit 124D. The first conversion unit 124A is coupled to an output end of the inverter 10 and the loop control unit 128. The first conversion unit 124A receives the drive currents Idr1-Idr3 and the angle command Or from the loop control unit 128, and provides a d-axis current signal Sid and a q-axis current signal Siq according to the drive currents Idr1-Idr3 and the angle command Or. The q-axis current controller 124B is coupled to the first conversion unit 124A, the second conversion unit 124D, and the loop control unit 128. The q-axis current controller 124B produces a q-axis voltage signal Svq according to the q-axis current signal Siq and the q-axis current command Ciq. In particular, the q-axis voltage signal Svq is a horizontal-axis (q-axis) component in a d-q-axis coordinate corresponding to a sum of the drive voltages Vdr1-Vdr3. The d-axis current controller 124C is similar to the q-axis current controller 124B, and produces a d-axis voltage signal Svd corresponding to a vertical-axis (d-axis) component in the d-q-axis coordinate. The second conversion unit 124D is coupled to the PWM unit 122 and the loop control unit 128, and provides the control signals Sc1-Sc3 to the PWM unit 122 according to the q-axis voltage signal Svq, the d-axis voltage signal Svd, and the angle command Or.

The load detection unit 126 determines whether the starter generator 2 has reversed to a position of before a compression top dead center of the engine 3 according to the first load information Vi1, and correspondingly provides the load signal Sl to the loop control unit 128. In particular, the first load information Vi1 can be the q-axis voltage signal Svq (indicated by the dotted lines) or the d-axis voltage signal Svd (indicated by the solid lines). Specifically, when the rotor (of the starter generator 2) reverses closer to the compression top dead center of the engine 3, it means that the load will be heavier. Therefore, the loading can be used to determine whether the rotor of the starter generator 2 has reversed to a proper position, thereby ensuring that the forward rotation start has the longest starting stroke, i.e., having the maximum moment of inertia to cross the compression top dead center.

Furthermore, when the load is heavier, the proportion of the real power of the mechanical output power of the starter generator 2 will be higher. In other words, if the drive voltage is projected to the d-q axis and the angle with the horizontal-axis (q-axis) is smaller, it means the d-axis voltage signal Svd of the first load information Vi1 will be smaller and the q-axis voltage signal Svq of the first load information Vi1 will be larger. Therefore, the load detection unit 126 determines whether the value change of the first load information Vi1 meets the above-mentioned heavy load condition. When the value change of the first load information Vi1 meets the heavy load condition, it means the rotor of the starter generator 2 is close to the compression top dead center of the engine 3, i.e., the rotor of the starter generator 2 has reversed to the proper position. Therefore, it can be avoided that when the starter generator is in the starting mode, the rotor of the starter generator is rotated by a fixed arc regardless of the initial position of the rotor thereof to cause energy consumption or noise production, thereby reducing the power consumption during starting process and reducing the hardware specification. Moreover, the current loading of the starter generator can be accurately estimated without relying on the position sensor or speed information, and the reversal time can be automatically adjusted according to the load condition to save extra starting time.

The loop control unit 128 includes an open-loop control unit 128A and a closed-loop control unit 128B, and the open-loop control unit 128A is coupled to the drive unit 124 and the load detection unit 126. In the start mode, the open-loop control unit 128A provides a first control command Cc1 and a second control command Cc2 to control the forward or reverse rotation of the starter generator 2 according to the load signal Sl without referring to the estimated motor speed information. In particular, the first control command Cc1 and the second control command Cc2 also include the current commands Cid, Ciq of driving the starter generator 2. In the start mode, when the open-loop control unit 128A realizes that the first load information Vi1 does not meet the heavy load condition according to the load signal Sl, it means that the rotor (of the starter generator 2) has not reversed to the proper position for starting, and therefore the open-loop control unit 128A provides the first control command Cc1 for controlling the reverse rotation of the starter generator 2. The first control command Cc1 controls each of the drive currents Idr1-Idr3 is a first drive current having a first frequency and a first amplitude so as to drive the starter generator 2 to reversely rotate. After a duration time, the first frequency and the first amplitude of the first drive current will be finally maintained/fixed at a first fixed frequency and a first fixed amplitude. Since the first control command Cc1 does not refer to the speed of the starter generator 2 as a control basis, the control manner may be called a speed open-loop control (I/F control) mode.

When the open-loop control unit 128A realizes that the first load information Vi1 meets the heavy load condition according to the load signal Sl, it means that the rotor (of the starter generator 2) has reversed to the proper position for starting, and therefore the open-loop control unit 128A provides the second control command Cc2 for controlling the forward rotation of the starter generator 2. The second control command Cc1 controls each of the drive currents Idr1-Idr3 is a second drive current having a second frequency and a second amplitude so as to drive the starter generator 2 to forwardly rotate. It is similar to the first drive current, after a duration time, the first frequency and the first amplitude of the first drive current will be finally maintained/fixed at a second fixed frequency and a second fixed amplitude. Similarly, since the second control command Cc2 does not also refer to the speed of the starter generator 2 as a control basis, the control manner may be also called a speed open-loop control (I/F control) mode. In particular, the first control command Cc1 and the second control command Cc2 also include the angle command Or, and the first control command Cc1 and the second control command Cc2 are provided to the drive unit 124 for controlling the angle of the forward and reverse rotation of the rotor (of the starter generator 2).

The open-loop control unit 128A further provides a start command Cs to the drive unit 124 for the excitation alignment of the starter generator 2. Specifically, before the generator control apparatus 1 wants to start the starter generator 2 (to perform the start mode), the excitation alignment in DC of the rotor of the starter generator 2 is performed in order to accurately and smoothly control the rotation of the rotor in the start mode. Therefore, the open-loop control unit 128A provides the start command Cs to the drive unit 124 so that the drive unit 124 can provide a current component of a predetermined angle to make the rotor of the starter generator 2 be attracted to the predetermined angle.

The control module 12 further can set a predetermined waiting time between the first control command Cc1 and the second control command Cc2 provided by the open-loop control unit 128A. The purpose of setting the predetermined waiting time is to wait for the starter generator 2 to be completely stationary before performing the forward rotation control so as to make the starter generator 2 smoothly and stably drive the engine 3 to increase the probability of successfully staring the engine 3.

The closed-loop control unit 128B is coupled to the drive unit 124 and the load detection unit 126. The closed-loop control unit 128B performs a forward rotation closed-loop control of the starter generator 2 according to whether the speed of the starter generator 2 reaches a predetermined speed. Specifically, when the open-loop control unit 128A provides the second control command Cc2 to drive the starter generator 2 to forwardly rotate, and the speed of the starter generator 2 reaches the predetermined speed, it means that the electrical angle θe of the starter generator 2 can be correctly estimated. After this, a feedback control (of providing a closed-loop control command Cclose to control the starter generator 2 in a closed-loop control mode, for example but not limited to a PI control) needs to be used to feed back the drive currents Idr1-Idr3 and speed information as control basis so as to make the starter generator 2 stably rotate. The closed-loop control command Cclose includes current commands Cid, Ciq of controlling the speed of the starter generator 2 and an angle command Or of controlling the angle of the starter generator 2.

Since the generator control apparatus 1 is a senseless control apparatus (without sensing position), the speed and the rotor position of the starter generator 2 both need to be estimated so as to determine whether the forward speed of the starter generator 2 has reached a determined speed under the closed-loop control mode or under the closed-loop control mode from the speed open-loop control mode. Therefore, the control module 12 further includes a control unit 130, and the control unit 130 is coupled to the drive unit 124 and the loop control unit 128. The control unit 130 includes an estimation unit 130A and a switch unit 130B. The estimation unit 130A is coupled to the drive unit 124 and the switch unit 130B, and the switch unit 130B is coupled to the loop control unit 128. The estimation unit 130A estimates an angular velocity ω, which is corresponding to the speed of the starter generator 2, and an electrical angle θe of the starter generator 2 according to a d-axis current signal Sid, a q-axis current signal Siq, a d-axis voltage signal Svd, and a q-axis voltage signal Svq of the drive currents Idr1-Idr3.

The switch unit 130B receives the angular velocity ω and selectively switch to couple the drive unit 124 to the open-loop control unit 128A or the closed-loop control unit 128B according to the angular velocity ω so that the loop control unit 128 provides the corresponding control command Cc according to operation conditions of the starter generator 2. The electrical angle θe is provided to the loop control unit 128 so that the loop control unit 128 provides the corresponding angle command Or according to the electrical angle θe. In one embodiment, in the start mode, when the starter generator 2 is initially stationary, the drive unit 124 is coupled to the open-loop control unit 128A so as to control the speed open-loop reverse and forward rotation of the starter generator 2. After the speed open-loop reverse and forward rotation of the starter generator 2 is completed and the speed of the starter generator 2 reaches the predetermined speed, the switch unit 130B switches the drive unit 124 to couple the closed-loop control unit 128B to perform the subsequent closed-loop control of the starter generator 2. Since the generator control apparatus 1 saves the circuit cost of expensive sensors (such as but not limited to Hall sensors), the generator control apparatus 1 of the present disclosure can reduce the circuit cost.

The control module 12 further includes a low-pass filter unit 140. The low-pass filter unit 140 is coupled to the drive unit 124 and the load detection unit 126, and is used to filter a second load information Vi2 (i.e., the q-axis voltage signal Svq or the d-axis voltage signal Svd) provided by the drive unit 124 in a low-pass manner to the first load information Vi1. Specifically, since the q-axis voltage signal Svq and the d-axis voltage signal Svd are DC signals with high-frequency components, and the high-frequency components may interfere with the load detection unit 126 to cause the risk of signal misjudgment, the low-pass filter unit 140 is used to filter out the high-frequency noise of the second load information Vi2 to increase the determination accuracy of the load detection unit 126.

Figure 3A:
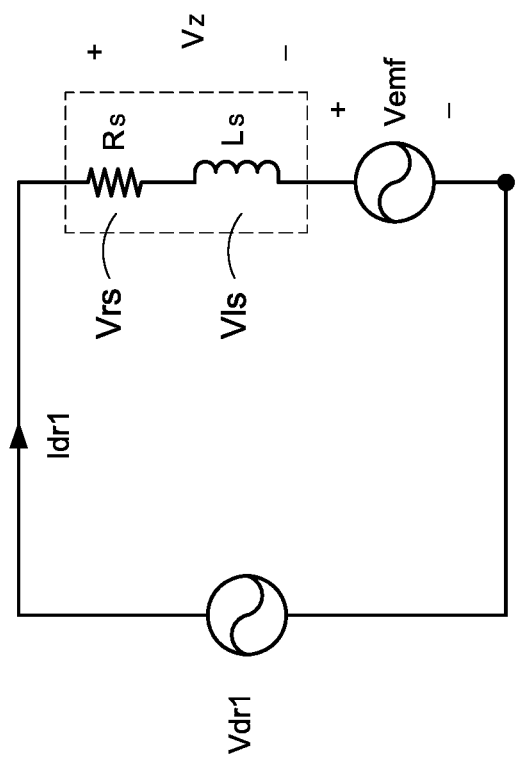
FIG. 3A is a schematic diagram of a single-phase equivalent circuit of a starter generator according to the present disclosure.
Figure 3B:
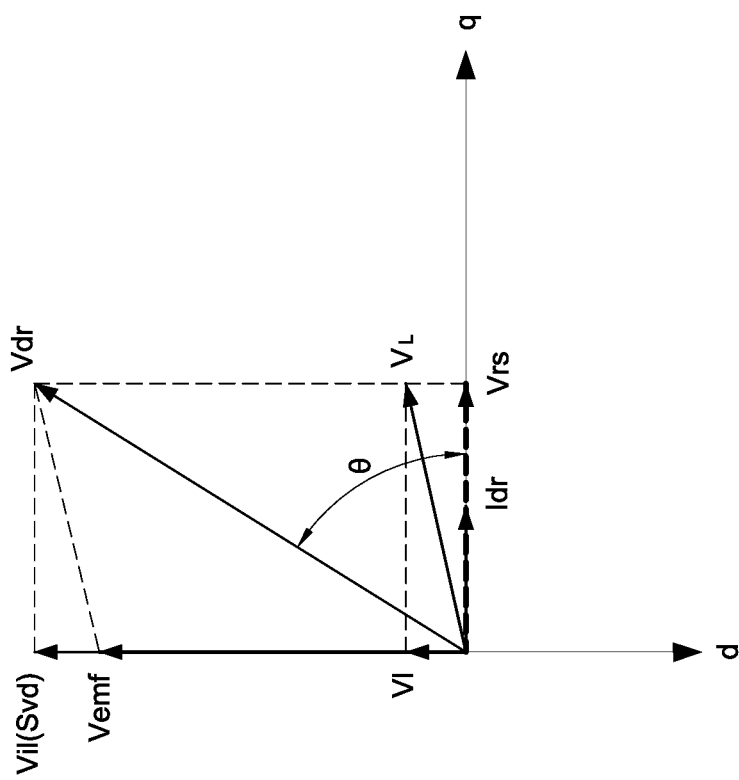
FIG. 3B is a schematic vector diagram of projecting a drive voltage and a drive current to a d-q-axis coordinate according to a first embodiment of the present disclosure.
Figure 3C:
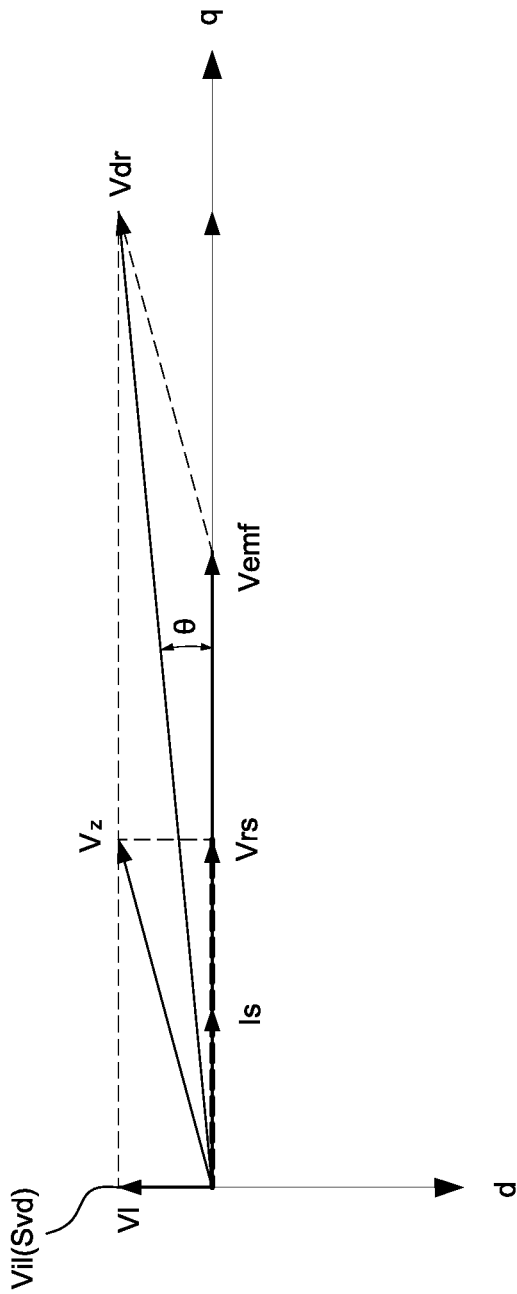
FIG. 3C is a schematic vector diagram of projecting the drive voltage and the drive current to the d-q-axis coordinate according to a second embodiment of the present disclosure.

Please refer to FIG. 3A, FIG. 3B, and FIG. 3C, which show a schematic diagram of a single-phase equivalent circuit of a starter generator, a schematic vector diagram of projecting a drive voltage and a drive current to a d-q-axis coordinate according to a first embodiment, and a schematic vector diagram of projecting the drive voltage and the drive current to the d-q-axis coordinate according to a second embodiment of the present disclosure, respectively, and also refer to FIG. 2A. In FIG. 3A, Vdr1 is a single-phase voltage, Idr1 is a single-phase current corresponding to Vdr1, Vrs is a voltage across an equivalent resistance Rs of the corresponding phase inside the starter generator 2, Vls is a voltage across an equivalent inductance Ls of the corresponding phase inside the starter generator 2, Vemf is a back EMF of the corresponding phase, and Vz is a resistance voltage (i.e., a vector sum of Vrs and Vls) of the starter generator 2. The mechanical output power of the starter generator 2 is represented in equation (1) as follows:

$$Pm = \omega \times Te \quad (1)$$

In equation (1), Pm is the mechanical output power of the starter generator 2, ω is an angular velocity, and Te is an output torque of the starter generator 2. The output torque is determined by the loading that the rotor shaft of the starter generator 2 bears when the speed of the starter generator 2 is maintained. When the loading that the rotor shaft bears increases, the output torque Te of the starter generator 2 will also increase to maintain the constant speed of the starter generator 2 so that the mechanical output power Pm of the starter generator 2 increases. In addition, the electrical input power of the starter generator 2 is represented in equation (2) as follows:

$$Pe = 3Vdr1 \times Idr1 \times \cos\theta_1 \cong 3Vemf \times Idr1 \times \cos\theta_2 \quad (2)$$

In equation (2), Pe is proportional to the mechanical output power of the rotor shaft of the starter generator 2, "3" is the number of phases, Vemf is a back EMF voltage, θ1 is an angle between the drive voltage Vdr1 and the drive current Idr1, and θ2 is an angle between the back EMF voltage Vemf and the drive current Idr1. The relationship between the mechanical output power and the electrical input power of the starter generator 2 is represented in equation (3) as follows:

$$Pm = Pe \times \eta \quad (3)$$

In equation (3), η is an efficiency of the starter generator 2. The equation (2) of the single-phase equivalent voltage and current can be applied to both the light load and the heavy load of the three-phase voltage and current of the starter generator 2, and the relative relationships between the voltage component and the current component are shown in FIG. 3B and FIG. 3C. FIG. 3B shows the light-load condition of the starter generator 2 and FIG. 3C shows the heavy-load condition of the starter generator 2. When the drive current Idr (i.e., a vector sum of the phase currents Idr1-Idr3) is a first drive current with the first fixed frequency and the first fixed amplitude (I/F control), the amplitude and the phase of the drive voltage Vdr (i.e., a vector sum of the phase voltages Vdr1-Vdr3) provided by the inverter 10 will be changed with the increased loading. In particular, the angle θ between the drive voltage Vdr and the drive current Idr clearly reflects the loading characteristics, that is, when the mechanical output power increases, the loading changes can be observed from the electrical input power. For example, when the d-axis loading increase, |Vi1|=|Vdr·sin θ| will reduce with it, and vice versa. Therefore, according to the comparison between FIG. 3B and FIG. 3C, the first load information Vi1 is the d-axis voltage signal or the q-axis voltage signal of the starter generator 2. In particular, the d-axis voltage signal is a vertical-axis (d-axis) component (i.e., the component projected onto the d-axis) of the drive voltage Vdr corresponding to the drive current Idr with an angle between the drive voltage Vdr, and the q-axis voltage signal is a horizontal-axis (q-axis) component of the drive voltage Vdr. As shown in FIG. 3B and FIG. 3C, the vertical-axis component of the drive voltage Vdr shown in FIG. 3B is greater than the vertical-axis component of the drive voltage Vdr shown in FIG. 3C, and therefore the loading shown in FIG. 3C is heavier than that shown in FIG. 3B. Also, the condition in horizontal-axis component is just opposite. Therefore, the load information Vi and the corresponding loading of the starter generator 2 can be derived according to the mechanical output power of the starter generator 2, and then compared with the heavy load condition set by the load detection unit 126 to realize whether the position of the rotor of the starter generator 2 has met the heavy load condition (i.e., the loading is close to the predetermined threshold value of the compression top dead center Cp.

Furthermore, the d-axis voltage signal Svd is the vertical axis component of the drive voltage Vdr corresponding to the vertical horizontal axis (i.e., the d-q axis). When the d-axis voltage signal is used as the first load information Vi1, and the first load information Vi1 changes from being greater than or equal to the first threshold value to being less than the first threshold value, or first load information Vi1 continuous to be less than the first threshold value for the predetermined time, it means that the heavy load condition is met (i.e., the rotor of the starter generator 2 is close to the compression top dead center). On the contrary, the q-axis voltage signal Svq is the horizontal axis component of the drive voltage Vdr corresponding to the vertical horizontal axis (i.e., the d-q axis). When the q-axis voltage signal is used as the first load information Vi1, and the first load information Vi1 changes from being less than or equal to the second threshold value to being greater than the second threshold value, or first load information Vi1 continuous to be greater than the second threshold value for the predetermined time, it means that the heavy load condition is met (i.e., the rotor of the starter generator 2 is close to the compression top dead center).

Figure 4:
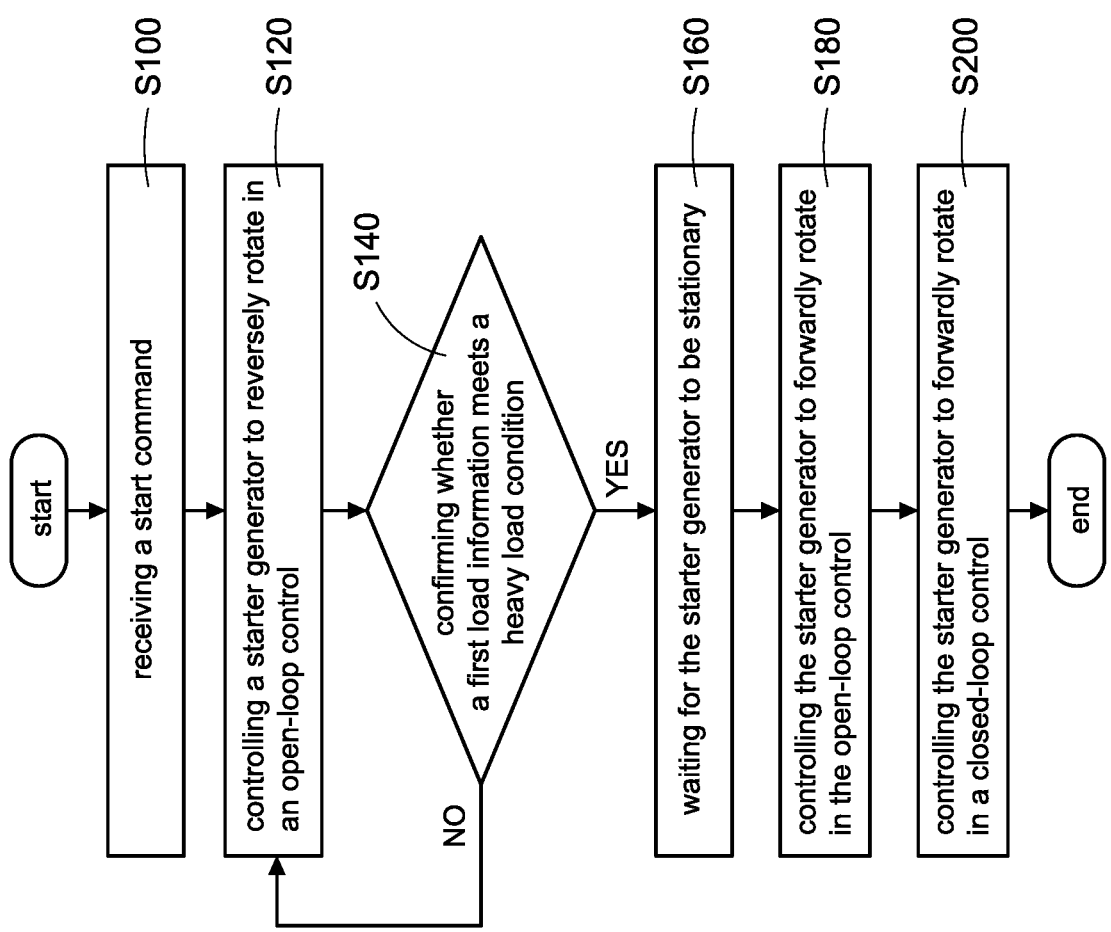
FIG. 4 is a flowchart of a method of starting a starter generator according to the present disclosure.

Please refer to FIG. 4, which shows a flowchart of a method of starting a starter generator according to the present disclosure, and also refer to FIG. 2 to FIC. 3C. The method of starting the starter generator 2 includes the following steps. First, receiving a start command (S100). The open-loop control unit 128A provides the start command Cs to the drive unit 124. Afterward, controlling the starter generator to reversely rotate in an open-loop control mode (S120). The open-loop control unit 128A drives the starter generator 2 to reversely rotate in a speed open-loop control mode (i.e., the I/F control of reverse rotation).

Afterward, confirming whether the first load information meets the heavy load condition (S140). When the open-loop control unit 128A realizes that the first load information Vi1 meets the heavy load condition according to the load signal Sl, it means that the rotor (of the starter generator 2) has reversed to the proper position for starting. On the contrary, it means that the rotor has not reversed to the proper position for starting, and the step (S120) is performed again. When the rotor has reversed to the proper position for starting, it is to wait for the starter generator to be stationary (S160). In particular, the way that the starter generator 2 is stationary may include forward-rotation stationary or control of braking.

Afterward, controlling the starter generator to forwardly rotate in the open-loop control mode (S180). The open-loop control unit 128A drives the starter generator 2 to forwardly rotate in the speed open-loop control mode (i.e., the I/F control of forward rotation). Finally, switching to a closed-loop control mode to control the starter generator forwardly rotating when the speed of the starter generator reaches a predetermined speed (S200). When the speed of the starter generator 2 reaches the predetermined speed, the speed or the torque of the starter generator 2 is fed back to perform the feedback control, for example but not limited to PI control so as to stably operate the starter generator 2. In particular, the speed of the starter generator 2 is acquired by estimating the angular velocity ω and the electrical angle θe of the starter generator 2 according to the d-axis current signal Sid, the q-axis current signal Siq, the d-axis voltage signal Svd, and the q-axis voltage signal Svq of the drive currents Idr1-Idr3 (i.e., the second drive currents) fed back by the control unit 130.

Figure 5A:
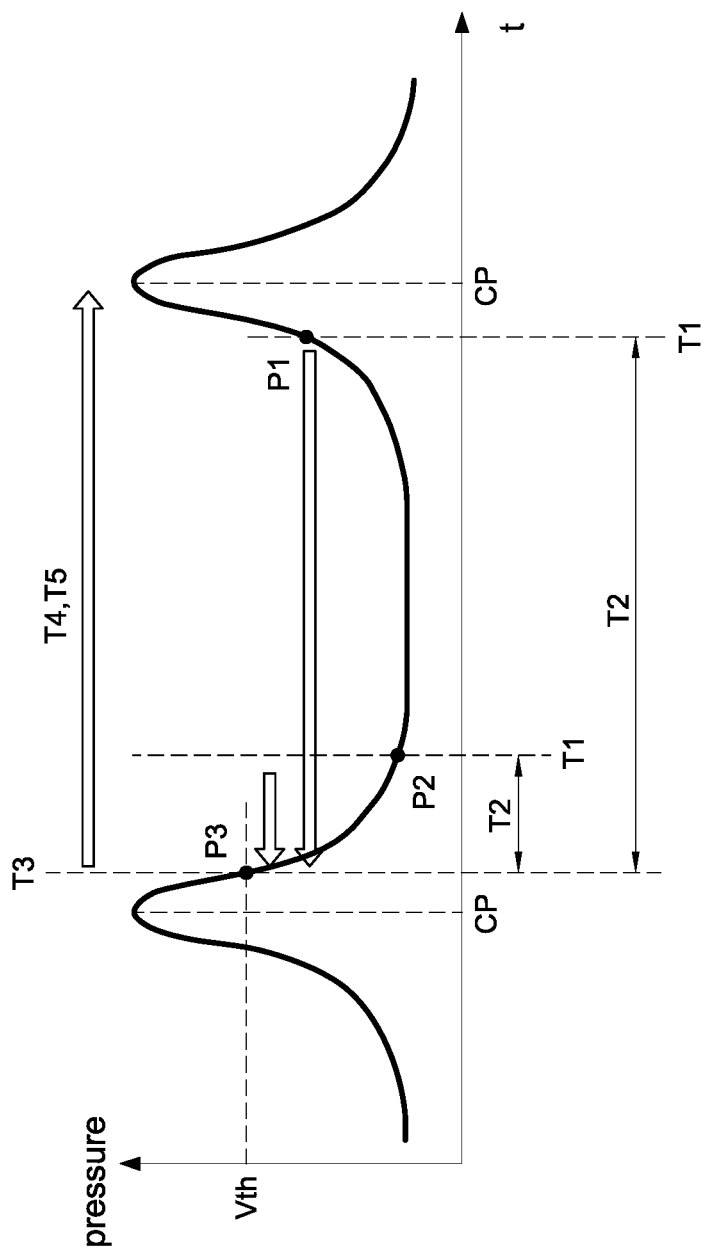
FIG. 5A is a schematic diagram of starting an engine by the starter generator according to the present disclosure.
Figure 5B:
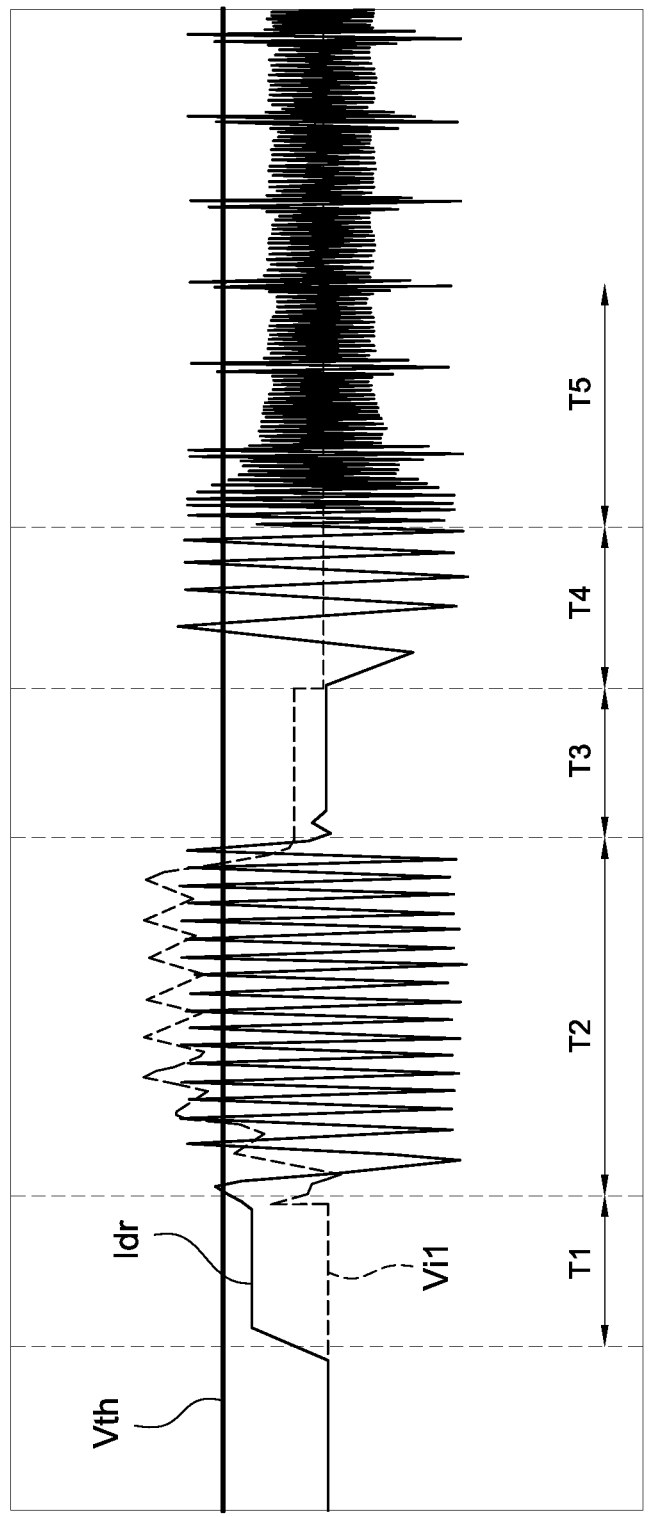
FIG. 5B is a first schematic waveform of starting the engine by the starter generator according to the present disclosure.

Please refer to FIG. 5A, FIG. 5B, and FIG. 5C, which show a schematic diagram of starting an engine by the starter generator, a first schematic waveform of starting the engine by the starter generator, and a second schematic waveform of starting the engine by the starter generator according to the present disclosure, respectively, and also refer to FIG. 2 to FIG. 4. In FIG. 5A, the highest pressure in the engine cylinder is the compression top dead center Cp, and the compression top dead center Cp is usually the point with the heaviest load. When the engine 3 has not been started, the rotor of the starter generator 2 usually stops at the bottom position between the two compression top dead centers Cp (assuming it stops at the points P1, P2). The control module 12 first controls the inverter 10 to drive the starter generator 2 to reversely rotate. Afterward, it is to determine whether the (rotor of the) starter generator 2 has reversed to a position of before the compression top dead center (i.e., a point P3) of the engine 3 according to the drive voltages Vdr1-Vdr3 and the drive currents Idr1-Idr3 of the starter generator 2 by determining whether the first load information Vi1 meets the heavy load condition. When the control module 12 realizes the rotor of the starter generator 2 has reversed to the point P3, the control module 12 waits for the starter generator 2 to be stationary. When the starter generator 2 is completely stationary, the control module 12 controls the inverter 10 to drive the starter generator 2 to forwardly rotate, thereby ensuring that the forward rotation start has the longest starting stroke, i.e., having the maximum moment of inertia to cross the compression top dead center Cp.

The waveform shown in FIG. 5B is corresponding to the point P1 of FIG. 5A, and the dotted line represents the first load information Vi1, the solid line represents the drive current Idr, and the horizontal line is the first threshold value Vth. During a time period T1, the generator control apparatus 1 performs an excitation alignment of the rotor of the starter generator 2 so that the rotor of the starter generator 2 is positioned at the point P1. During a time period T2, the generator control apparatus 1 uses the speed open-loop control mode to provide a first drive current with a first frequency and a first amplitude to the starter generator 2 to drive the starter generator 2 reversely rotating.

As shown in FIG. 5B, after a short duration, the first frequency and the first amplitude of the first drive current will be finally maintained/fixed at a first fixed frequency and a first fixed amplitude. At this condition, the first load information Vi1 changes from being less than the first threshold value Vth to being greater than the first threshold value Vth. Also, between the time period T2 and a time period T3, the first load information Vi1 changes from being greater than or equal to the first threshold value Vth to be less than the first threshold value Vth, the rotor of the starter generator 2 rotates to the point P3. During the time period T3, the generator control apparatus 1 waits for a predetermined waiting time to wait for the starter generator to be stationary. During a time period T4, the generator control apparatus 1 uses the speed open-loop control mode to provide a second drive current with a second frequency and a second amplitude to the starter generator 2 to drive the starter generator 2 forwardly rotating. It is similar to the first drive current, after a duration time, the second frequency and the second amplitude of the second drive current will be finally maintained/fixed at a second fixed frequency and a second fixed amplitude. Between the time period T4 and a time period T5, the speed of the starter generator 2 has reached the predetermined speed, the starter generator 2 can be controlled in a closed-loop control mode. During the time period T5, the generator control apparatus 1 controls the starter generator 2 to forwardly rotate in the closed-loop control mode to operate in a generation mode.

The waveform shown in FIG. 5C is corresponding to the point P2 of FIG. 5A, and it has a shorter reversing distance, and a time for the starter generator 2 to reversely rotate is also relatively short (compared to FIG. 5B). The rest of the time periods are roughly similar to those in FIG. 5B, and therefore the detail description is omitted here for conciseness. In particular, when the starting point of the rotor of the starter generator 2 is just at the point P3, the first load information Vi1 will always be less than the first threshold value Vth during the time period T2. Therefore, when the initial of the first load information Vi1 is already less than the first threshold value Vth, and the first load information Vi1 is still less than the first threshold value Vth after the drive currents Idr1-Idr3 elapse in a duration time become the first drive current with the first fixed frequency and the first fixed amplitude, the starter generator 2 stops reversely rotating and enters the time period T3. Therefore, the predetermined time is may be substantially equal to the duration time.

Figure 6:
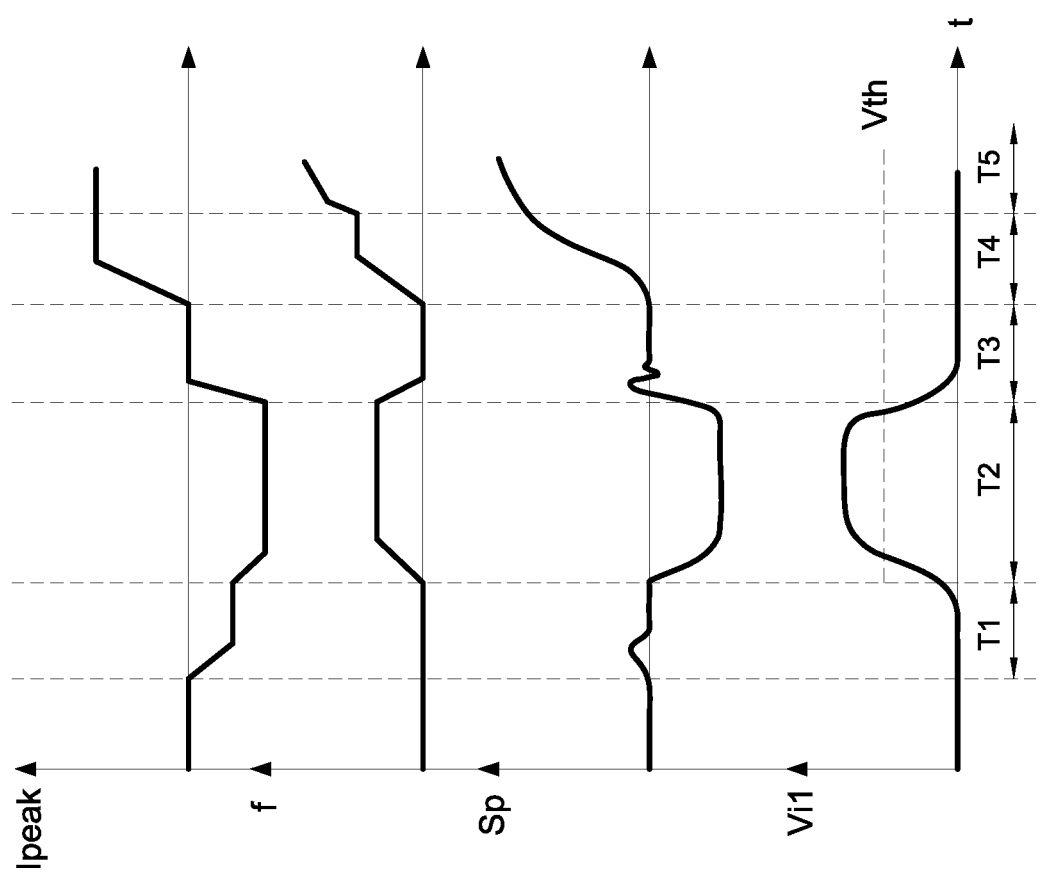
FIG. 6 is a waveform of operating the starter generator in a start mode according to the present disclosure.

Please refer to FIG. 6, which shows a waveform of operating the starter generator in a start mode according to the present disclosure, and also refer to FIG. 2 to FIG. 5C. The waveform of this embodiment is based on the process of starting the engine by the starter generator shown in FIG. 5B as an example. FIG. 5C or the waveform of the rotor starting point of the starter generator 2 which happens to be at the point P3 can be deduced from the waveform of FIG. 6, and therefore the detail description is omitted here for conciseness. During the time period T1, an excitation alignment in DC of the rotor of the starter generator 2 is performed by the generator control apparatus 1. During the time period T2, the current commands Cid, Ciq provided by the loop control unit 128 control the generator control apparatus 1 to provide the first drive current with a first frequency and a first amplitude. Therefore, a current peak value Ipeak (negative) of the current commands Cid, Ciq reduces to a fixed value, and a frequency f increases to a fixed frequency. The first load information Vi1 (take the vertical-axis component Svd of the drive voltage as an example) changes from being less than the first threshold value Vth to being greater than or equal to the first threshold value Vth.

Between the time period T2 and the time period T3, the first load information Vi1 changes from being greater than or equal to the first threshold value Vth to be less than the first threshold value Vth so as to meet the heavy load condition. During the time period T4, the current commands Cid, Ciq provided by the loop control unit 128 controls the generator control apparatus 1 to provide a second drive current with a second frequency and a second amplitude. Therefore, a current peak value Ipeak (positive) of the current commands Cid, Ciq increases to a fixed value, and a frequency f increases to a fixed frequency. During the time period T5, the speed Sp of the starter generator 2 has reached the predetermined speed, the starter generator 2 can be controlled in a forward-rotation closed-loop control.

In one embodiment, the waveforms shown in FIG. 5B to FIG. 6 take the d-axis voltage signal Svd as the first load information Vi1 to be corresponding to whether the first load information Vi1 is less than the first threshold value Vth or not. When the q-axis voltage signal Svq is used as the first load information Vi1, the waveforms shown in FIG. 5B to FIG. 6 and the determined threshold value (i.e., the second threshold value) are just opposite to those based on the d-axis voltage signal, and therefore the detail description and drawings are omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of starting an integrated starter generator, driving a starter generator without using a rotor position sensor to start an engine, the method comprising steps of:
   (a) applying a first drive current with a first frequency and a first amplitude to drive the starter generator to reversely rotate in a speed open-loop control mode, acquiring a d-axis voltage signal and/or a q-axis voltage signal according to a drive voltage and the first drive current of the starter generator, and using the d-axis voltage signal and/or the q-axis voltage signal as a first load information,
   (b) confirming whether the first load information meets a heavy load condition,
   (c) stopping reversely rotating the starter generator when the first load information meets the heavy load condition, and
   (d) forwardly rotating the starter generator to drive the engine to start,
   wherein the speed open-loop control mode is according to whether the drive voltage and the first drive current correspondingly meet the heavy load condition, without referring to a speed of the starter generator.

2. The method of starting the integrated starter generator as claimed in claim 1, wherein the step (d) comprises steps of:
   (d1) applying a second drive current with a second frequency and a second amplitude to drive the starter generator to forwardly rotate,
   (d2) estimating a speed of the starter generator according to the drive voltage and the second drive current, and
   (d3) performing a forward-rotation closed-loop control to the starter generator when the speed reaches a predetermined speed.

3. The method of starting the integrated starter generator as claimed in claim 1, before step (a) further comprising a step of:
   (a0) providing a current component of a predetermined angle to make a rotor of the starter generator be attracted to the predetermined angle according to a start command.

4. The method of starting the integrated starter generator as claimed in claim 1, wherein the step (c) comprises a step of:
   (c1) providing a predetermined waiting time for the starter generator to be stationary.

5. The method of starting the integrated starter generator as claimed in claim 1, wherein the step (a) comprises steps of:
   (a1) acquiring a second load information according to the drive voltage and the first drive current, and
   (a2) low-pass filtering the second load information to acquire the first load information.

6. The method of starting the integrated starter generator as claimed in claim 1, wherein the first load corresponds a loading of the starter generator.

7. The method of starting the integrated starter generator as claimed in claim 1, wherein the first load information is the d-axis voltage signal, and the d-axis voltage signal is a vertical-axis component of the drive voltage corresponding to a vertical-horizontal axis, and the step (c) comprises a step of:

(c2-1) meeting the heavy load condition when the first load information changes from being greater than or equal to a first threshold value to being less than the first threshold value, or when the first load information continuous to be less than the first threshold value for a predetermined time.

8. The method of starting the integrated starter generator as claimed in claim 1, wherein the first load information is the q-axis voltage signal, and the q-axis voltage signal is a horizontal-axis component of the drive voltage corresponding to a vertical-horizontal axis, and the step (c) comprises a step of:

(c2-2) meeting the heavy load condition when the first load information changes from being less than or equal to a second threshold value to being greater than the second threshold value, or when the first load information continuous to be less than the second threshold value for a predetermined time.

\* \* \* \* \*